United States Patent Office 3,625,642
Patented Dec. 7, 1971

3,625,642
PRINTED TEXTILE FIBERS AND METHOD
FOR PRODUCING SAME
Feaster V. Tribble, Rock Hill, S.C., assignor to
Martin Marietta Corporation
No Drawing. Filed Aug. 1, 1967, Ser. No. 657,503
Int. Cl. C09b 27/00
U.S. Cl. 8—27                                                 7 Claims

ABSTRACT OF THE DISCLOSURE

There are disclosed herein cotton and regenerated cellulose textile fibers having printed thereon a mixture of azoic dye and the dyestuff resulting from reacting $Na_2S_{2-4}$ with certain thiosulfate dyes. There is also disclosed a printing method comprising the steps of applying to cotton or regenerated cellulose textile fibers an alkaline printing paste comprising water, thickener, dyestuff selected from the group consisting of azo, sulfur, phthalocyanine, metal phthalocyanine, perylene, dioxazine, anthraquinone, and isodibenzanthrone dyes having per dye molecule at least one pendant —$SO_3Na$, —$SO_3K$, —$SO_3NH_4$ or —$SO_3H$ group, solubilized triazene form of stabilized diazo compound, and a solubilized naphthol coupling component; drying the fibers; acid ageing the fibers with volatilized acid and aqueous steam; applying aqueous $Na_2S_{2-4}$ and either soda ash or sodium borax to the fibers; optionally exposing the fibers to air; and washing the fibers.

---

The present invention relates to printed textile fibers and method of producing same.

Generally speaking, the present invention is a method of producing printed textile fibers comprising the steps of applying to cotton or regenerated cellulose textile fibers an alkaline printing paste comprising water, thickener, dyestuff selected from the group consisting of azo, sulfur, phthalocyanine, metal phthalocyanine, perylene, dioxazine, anthraquinone, and isodibenzanthrone dyes having per dye molecule at least one pendant —$SO_3Na$, —$SO_3K$, —$SO_3NH_4$ or —$SO_3H$ group, solubilized triazene of stabilized diazo compound, and a solubilized naphthol coupling component; drying the fibers; acid ageing the fibers with volatilized acid and aqueous steam; applying aqueous $Na_2S_{2-4}$ and either soda ash or sodium borax to the fibers; and washing the fibers with water. Optionally, and advantageously, the fibers may be exposed to air after application of the $Na_2S_{2-4}$ and prior to washing.

The products of this invention are cotton or regenerated cellulose textile fibers, such as fabrics or yarns, having printed thereon a mixture of azoic dye and water insoluble dyestuff resulting from reacting $Na_2S_{2-4}$ with the above described dyes having at least one pendant —$SO_3Na$, —$SO_3K$, —$SO_3NH_4$ or —$SO_3H$ group.

It has been known for many years in the prior art to print cellulosic textiles with thickened aqueous printing paste containing a naphthol (condensation product of an oxycarboxy acid with an aromatic amine) and triazene form of stabilized diazo compound, and to develop the colors by acid ageing with vaporized acetic acid and/or formic acid in aqueous steam. Mixtures of naphthols and triazene form of stabilized diazo compound form dyestuffs belonging to the general class known as azoic dyes, are referred to in Colour Index as C. I. Azoic Compositions, and are commonly known as Rapidogen® colors (trademark of General Aniline & Film Corp.) See Lubs, The Chemistry of Synthetic Dyes and Pigments, Reinhold Publishing Corp., pp. 184–192, 217–221 (1955), and BIOS Final Report No. 998, Item 22 (PB 60885), pp. 22–45 for a description of naphthols, triazene form of stabilized diazo compounds and Rapidogen colors.

One of the major difficulties with azoic dyes of the triazene form of stabilized diazo compound plus naphthol type is the limitation of shade range. For example, a range of bright blues, a range of bright yellows, oranges of good fastness, and a range of economical greens are missing from the line. Moreover, several such scarlet dyes cannot be shaded to oranges of good fastness, several such browns cannot be shaded to the yellow or blue side, and several such navy blues cannot be shaded to reddish blue or green. The primary cause of this difficulty is that attempts to shade one such azoic dye with another such azoic dye usually involve using mixtures of two different triazene form of diazo compounds and two different naphthol coupling components to form the azoic dye, and cross-coupling often occurs, e.g. a portion of each diazo couples with a portion of each napthol yielding unintended colors and non-uniform prints. Moreover, attempts to shade these azoic dye formers by using components forming azoic yellows cause special problems, because yellow azoic dyes generally have poor light fastness or poor fastness to formaldehyde fumes.

To broaden the shade range obtainable with triazene form of stabilized diazo compounds and naphthols and avoid cross-coupling, it has also been known in the prior art to shade such azoic dye formers with fiber reactive type dyes. However, this process has the disadvantage of requiring two separate steaming steps, namely acid ageing (steaming) to develop the azoic type dyes, and neutral ageing (steaming) to develop the fiber reactive dye. Another difficulty with this process is that relatively expensive fiber reactive dyes are used for shading the relatively inexpensive azoic dyes.

The process of the present invention overcomes the above disadvantages and limitations of the prior art and provides additional advantages as follows.

It has now been found that dyes having at least one pendant —$SO_3Na$, —$SO_3K$, —$SO_3NH_4$ or —$SO_3H$ group, and preferably 1–4 such groups, may be printed in combination with solubilized triazene form of stabilized diazo compound and solubilized naphthol coupling component, without affecting the formation or stability of the azoic dye. Surprisingly, the thiosulfate or thiosulfuric acid dyes are not decomposed when subjected to acid ageing, and one with skill in the art would expect acid ageing to convert these soluble dyes to the corresponding insoluble acid thiol form and thereby render the process valueless, but this does not occur. Also, there is no cross coupling between the azoic dyes and the thiosulfate dyes, and therefore printings of excellent uniformity may be obtained. Moreover, only one steaming step is required in the present process. Importantly, a much broader color range than hitherto obtainable from the triazene form of stabilized diazo compounds and naphthols, with good fastness properties and with excellent economy, is now obtainable. For example, bright blues, yellows, oranges of good fastness, browns shaded to the yellow, red or blue sides, and navy blue shaded to the red or green side are now obtainable. Moreover, yellow thiosulfate dyes may be substituted for the components forming yellow azoic dyes hitherto used in shading other azoic dyes, and light fastness and formaldehyde fastness are thereby improved. Generally speaking, thiosulfate dyes are less expensive than fiber reactive dyes, and economies may thus be realized.

The following is a more detailed description of the process of the present invention.

The printing paste composition comprises water, thickener, alkali, solubilized triazene form of stabilized diazo compound, solubilized naphthol coupling component, and dyestuff of the azo, sulfur, phthalocyanine, metal phthalocyanine, perylene, dioxazine, anthraquinone, or isodibenzanthrone types having at least one pendant —SSO₃Na, —SSO₃K, —SSO₃NH₄ or —SSO₃H group per dye molecule, and preferably 1–4 of such pendant groups. The pendant thiosulfate groups may be attached directly to a C atom of an aryl group of the dye molecule, or a bridging member, such as a hydrocarbon radical which may be substituted, if desired, and interrupted by hetero atoms, may be interposed between the thiosulfate group and a C atom of an aryl group of the dye. Non-limiting examples of bridging members by which a thiosulfate group may be linked to a carbon atom of an aryl group of the dyestuff are lower alkylene, -O-lower alkylene-, -CO-NH-lower alkylene-, -NH-lower-alkylene-, $$-\text{NH-lower alkylene-, and } -SO_2-\underset{R}{N}-A-$$

in which R is H or lower alkyl and A is lower alkylene,

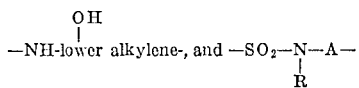

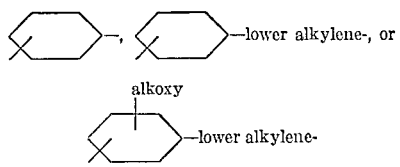

The thiosulfate dyes described in British Patent No. 953,428, Belgian Patent No. 652,691, and German Patent No. 1,163,473 are non-limiting examples of dyes suitable for use in the present process.

The amount of dyestuff to be used in the printing paste will be determined by the depth of shade desired, and the proportional amounts of azoic dye forming components and thiosulfate dye will be determined by the particular shade desired.

Generally speaking, about 0.05%–8%, and preferably about 0.5%–2% of thiosulfate dye, calculated as percent by weight concentrated thiosulfate dye solids in the printing paste, will be suitable for most purposes. Generally speaking, about 0.2%–5%, and preferably about 1%–2% of the azoic dye forming components (triazene form of stabilized diazo compound plus naphthol coupling component), calculated as percent by weight concentrated azoic dye solids in the printing paste, will be suitable for most purposes.

The azoic dye forming components as used in the printing paste comprise a mixture of conventional triazene form of solubilized stabilized diazo compound and a solubilized naphthol coupling component. Triazene form of stabilized diazo compounds are well known and are produced by reacting equimolar amounts of diazotized amines with primary or preferably secondary amines free from azo coupling positions and bearing groups promoting solubility in water. Illustrative and non-limiting examples of diazotizable amines customarily used for reaction with the stabilizer amine to form the triazene are those listed under the column entitled "Base" at Lubs, supra, p. 220, and further identified by name and structure at pp. 196–207 of Lubs. Illustrative and non-limiting examples of amines customarily used as stabilizers are 4-sulfoanthranilic acid, N-ethyl-5-sulfoanthranilic acid, N-methyl-5-sulfoanthranilic acid, N-methyltaurine, and sarcosine. In most instances, the ratio of triazene form of stabilized diazo compound to naphthol or naphthols in the azoic dye will be about 1:1, expressed as nitrite equivalents; however, it may be about 1:2.

Before its incorporation into the printing paste, the azoic dye forming components are solubilized in conventional manner, for example by stirring the naphthol and stabilized diazo into a small amount of NaOH together with 3–5 times their weight of an organic solvent, such as isopropyl alcohol, ether plus isopropyl alcohol, or glycolmonoethylether.

Components for making azoic dyes suitable for use herein are readily available commercially in pre-mixed and solubilized form. These commercial mixtures usually contain by weight about 18%–30% dyestuff (triazene form of stabilized diazo compound plus naphthol), together with diluents such as sodium sulphate or amylose, and solubilizer such as NaOH together with isopropyl alcohol, ether plus isopropyl alcohol, or glycolmonoethylether.

As used herein, the term "azoic dyes" refers to insoluble azo colors which are formed on cellulosic fibers from diazo compounds and coupling components.

Enough alkali, such as Na₂CO₃ or NaOH, should be incorporated into the printing paste so that it is on the alkaline side, preferably about pH 7.5–10.

The printing paste will also contain enough water and thickener to give it the conventional viscosity of printing pastes. Examples of suitable thickeners are neutral thickeners, such as etherized starch, sodium alginate, corn starch, or locust bean gum; and emulsion thickeners, such as oil in water and water in oil.

Optionally, the printing paste may also contain leveling agents and solubilizing assistants such as urea, thiourea, and sodium thiosulfate.

The printing paste may be printed at room temperature onto the cotton or regenerated cellulose textile fibers, such as fabrics or yarns, by any desired means such as engraved roller, silk screen, or surface roller. If desired, the printing paste may be applied warm.

Following printing, the textile fibers are dried, for example by passing them through a hot air oven, until the printing paste is substantially dry.

Following drying, the textile fibers are subjected to acid ageing in the conventional manner to convert the stabilized diazo compound to its diazotized amine form and develop the azoic dye by allowing the coupling reaction between the naphthol and diazotized amine to proceed. Acid ageing is conducted in the conventional manner by subjecting the fibers to aqueous steam and volatilized acid in a closed chamber, for example a saturated atmosphere of aqueous steam made acid with acetic acid, or formic acid, or a mixture of acetic and formic acid. One particularly suitable acid ageing process is to subject the printed textile for 2.5–4 minutes to saturated aqueous steam at 212°–220° F. containing about 1.75% acetic acid.

Following acid ageing, an aqueous solution of Na₂S₂₋₄ may be applied to the fibers by any desired method, and conveniently by padding the fibers through a three or four bowl padding mangle containing about 0.2%–1.2%, and preferably about 0.6%, aqueous Na₂S₂₋₄ calculated as percent by weight solids, and squeezing to 60% wet pick-up based on fabric weight. Fixation of the thiosulfate dye with Na₂S₂₋₄ is practically instantaneous. The Na₂S₂₋₄ should also contain enough soda ash or sodium borax to neutralize residual acid from the acid ageing step. Usually, about 2% by weight soda ash or sodium borax will be suitable for this purpose. Optionally, and advantageously, the aqueous Na₂S₂₋₄ may also contain 1–20%, and preferably about 15%, by weight NaCl to deter bleeding of the dyes into the Na₂S₂₋₄ solution. The Na₂S₂₋₄ solution may be applied to the fibers at room temperature, and no particular advantage results from applying it at an elevated temperature. If desired, the Na₂S₂₋₄ solution may also contain a small amount of carbitol, which is sometimes used in concentrated stock solutions of Na₂S₂₋₄ to prevent precipitation of sulfur therefrom on standing.

As used herein, the term Na₂S₂₋₄ refers to a sodium polysulfide or to mixtures of sodium polysulfides, e.g. to disodium disulfide, or disodium trisulfide, or disodium tetrasulfide, or to mixtures of any two or three of these polysulfides. In the case of mixtures, the 2–4 subscript of the S atom would not necessarily be a whole number. Sodium polysulfides are well known, and are prepared by adding flowers of sulfur to a hot aqueous solution of sodium sulfide.

For best results, the fibers may be exposed to air for about 5–30 seconds following application of the Na₂S₂₋₄ and soda ash or sodium borax, depending on the weight of the goods, to permit time for contact between the thiosulfate dye and the Na₂S₂₋₄, and reaction. This may be accomplished by a simple skying step. Thereafter, the goods are washed with water, which may be at room temperature, to remove salt and other water soluble residues from the fibers.

Following washing, the fibers may be scoured and dried in conventional manner.

Prints having excellent color yield and good wet fastness properties result from the above process.

In the following examples, the embodiments are illustrated with reference to the —SSO₃Na salts of the dyes, but it will be understood that the corresponding —SSO₃K, —SSO₃NH₄ or —SSO₃H forms of the dye may be substituted, and if the —SSO₃H form of the dye is employed, the amount of soda ash employed will be increased to render the printing paste alkaline.

The following examples are illustrative of the process of the present invention. All parts herein are by weight unless otherwise specified. In the examples, the combined naphthol coupling components and triazene form of stabilized diazo compounds are listed by their well known Rapidogen trade names for convenience. These Rapidogen colors are identified chemically and by method for making same at Lubs, supra, pp. 220, 184–192, 196–207 and at BIOS Final Report No. 998, Item No. 22 (PB60885), pp. 22–45.

EXAMPLE 1

A printing paste consisting of 4 parts sodium alginate neutral thickener
90.8 parts water
0.2 parts soda ash
2 parts

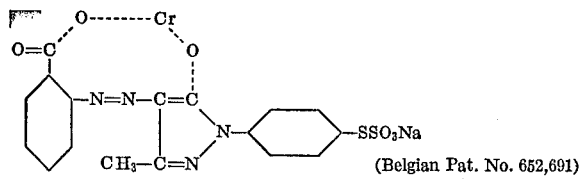

(Belgian Pat. No. 652,691)

3 parts of 20 parts Rapidogen Navy Blue B solubilized in 79 parts isopropyl alcohol and 1 part NaOH 100 parts and having pH 8 is printed at room temperature onto woven cotton print cloth weighing 3 oz./sq. yd.; the cloth is dried to substantial dryness; acid aged by streaming for 3 minutes in an air free chamber containing aqueous steam at 212° F. containing about 1.75% acetic acid; padded through a four-bowl padder containing 0.6% Na₂S₄, 2% soda ash and 15% NaCl in aqueous solution at room temperature; squeezed to 60% wet pick-up based on fabric weight; passed through the air for 30 seconds; rinsed with water at room temperature; soaped, rinsed with water and dried. A "bottle" green print of good wet, light and formaldehyde fume fastness results.

EXAMPLE 2

This example is the same as Example 1 above, except that 2 parts of CuPc-(SO₂NHCH₂CH₂SSO₃Na)₃, wherein CuPc is the radical of copper phthalocyanine (U.S. Pat. No. 3,236,860) is substituted for the thiosulfate dye used in Example 1. A greenish blue print of good wet, light and formaldehyde fume fastness results.

EXAMPLE 3

A printing paste consisting of 4 parts etherized starch neutral thickener
91.8 parts water
2 parts of 20 parts Rapidogen Scarlet R solubilized in 97 parts isopropyl alcohol and 1 part NaOH
0.2 parts soda ash
2 parts sodium salt form of thiosulfate dye prepared by coupling equimolar amounts diazotized sodium S-4-aminophenylthiosulfate and aceto-2′,5′-dimethoxyanilide 100 parts and having pH 7.5 is printed onto woven viscose rayon weighing 2.5 oz./per square yard; whereafter the cloth is dried to substantial dryness; acid aged by steaming for 3 minutes in an air free chamber containing aqueous steam at 212° F. containing 1.77% formic acid; padding through a four bowl padder containing 0.6% Na₂S₂ and 2% sodium borax in aqueous solution at room temperature; squeezed to 60% wet pick-up based on fabric weight; rinsed with water at room temperature; scoured and dried. A bright orange print of good wet, light and formaldehyde fume fastness properties results.

EXAMPLE 4

A printing paste consisting of 5 parts corn starch neutral thickener
83.35 parts water
0.15 parts soda ash
1.5 parts thiosulfate dye used in Example 2 above
10 parts 20 parts Rapidogen Brown IBR solubilized in 79 parts isopropyl alcohol and 1 part NaOH 100 parts and having pH 8 is printed at room temperature onto running strands of 16's cotton or viscose rayon yarn, whereafter the yarn is subjected to the treatments described in Example 1 above. Printed brown yarn, shaded to the yellow side, having good light, wet and formaldehyde fume fastness properties results.

EXAMPLE 5

This example is the same as Example 1 above, except that a printing past consisting of 93.35 parts oil in water emulsion thickener (10% urea, 1% sodium lauryl sulfate, 49% and 4% aqueous etherized locust bean gum, and 40% straight petroleum aliphatic solvent conforming to U.S. Dept. of Commerce CS3–40)
5 parts of 20 parts Rapidogen Brown IBR solubilized in 79 parts isopropyl alcohol and 1 part NaOH
0.15 parts soda ash
1.5 parts

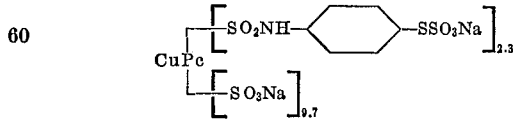

wherein CuPc is the radical of copper phthalocyanine (U.S. Pat. No. 3,325,511)

100 parts and having pH 8 is substituted for the printing paste of Example 1, and except that the aqueous steam contains 1% acetic acid and 0.5% formic acid instead of 1.75% acetic acid. A brown print shaded to the blue side results having good light and wet fastness properties.

EXAMPLE 6

This example is the same as Example 1 above, except that the following printing paste is substituted for the printing paste used in Example 1.

90.8 parts water in oil emulsion thickener (8% of 50% xylene solution of ethyl cellulose, 25% straight petroleum aliphatic solvent conforming to U.S. Dept. of Commerce CS3-40, and 67% water)
0.2 parts soda ash
8 parts of 20 parts Rapidogen Brown IBR solubilized in 79 parts isopropyl alcohol and 1 part NaOH
1 part sodium salt of the thiosulfate dye prepared by coupling 1 g.m.w. tetrazotized

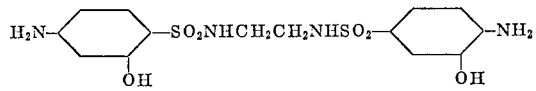

and 2 g.m.w. 1-(4'-sodiothiosulfatophenyl)-3-methyl-5-pyrazolone (Belgian Patent No. 652,-691); and heating 1 g.m.w. of the result and 1188 gms. 50% aqueous chromium acetate monohydrate with 2 g.m.w. of the product prepared by coupling equimolar amounts of diazotized 4-chlor-2-aminophenyl-6-sulfonic acid and 1-(4'-sodiothiosulfatophenyl)-3-methyl-5-pyrazolone 100 parts The resulting brown print is shaded to the red side and has good wet and light fastness properties.

EXAMPLES 7-17

The examples given in the following table are the same as Example 1 above, (a) except that the printing paste consists of 4 parts sodium alginate neutral thickener, enough soda ash or NaOH to provide pH 7-10, 2 parts of the thiosulfate dye listed in column 2 below, 5 parts of 20 parts of the Rapidogen dye listed in column 3 below solubilized in 79 parts isopropyl alcohol and 1 part NaOH, and enough water to bring the total weight to 100 parts, and (b) except that the four bowl padder contains 2% soda ash, 15% NaCl and the percent of the polysulfide listed in column four below. The resulting prints have the color listed in column five and good fastness to light, wet treatments and formaldehyde fumes.

TABLE

| Ex. No. | Thiosulfate | Rapidogen | Percent polysulfide | Color |
|---|---|---|---|---|
| 7 | (structure: anthraquinone with NH—CH₃ and NHCH₂CHCH₂—S S O₃Na, OH) | Violet B | 0.2% Na₂S₄ | Red-blue. |
| 8 | (structure: anthraquinone with NH₂ and NHCH₂CH₂ S S O₃Na) | Red R | 1.2% Na₂S₂ | Do. |
| 9 | SO₂NHCH₂CH₂SSO₃Na (perylene diimide structure) NaO₃S S CH₂CH₂NH S O₂ | Navy blue B. | 0.6% Na₂S₃ | Blue-red. |
| 10 | [H₅C₂—N ... Cl ... Cl ... N—C₂H₅ structure] ≡(S O₂NHCH₂CH₂ S S O₃Na)₄ | Scarlet RS | 0.7% Na₂S₃.₅ | Violet. |
| 11 | Sodium salt of dye obtained by reacting mole of disulfonyl chloride of isodibenzanthrone and 2 moles sodium S-(2-aminoethyl) thiosulfate. | Red R | 1% Na₂S₂.₅ | Red-blue. |
| 12 | Sodium salt of C.I. Solubilised Sulphur Green 2 (C.I. No. 53572). | Black IT | 0.8% Na₂S₄ | Olive. |

TABLE—Continued

| Ex. No. | Thiosulfate | Rapidogen | Percent polysulfide | Color |
|---|---|---|---|---|
| 13 | [structure: anthraquinone with NH$_2$, SO$_3$H, and NH-C$_6$H$_3$(OCH$_3$)-CH$_2$SSO$_3$Na substituents] | Scarlet RS | 0.5% Na$_2$S$_3$ | Red-blue. |
| 14 | [structure: naphthol azo compound with SO$_2$-N(CH$_3$)-CH$_2$CH$_2$SSO$_3$Na, OH, CONH-C$_6$H$_3$(CH$_3$)-OCH$_2$CH$_2$SSO$_3$Na] | Violet B | 0.6% Na$_2$S$_2$ | Blue-red. |
| 15 | Sodium salt of dyestuff resulting from condensing mole of phthalocyanine-trisulfonyl chloride with 3 moles 3-amino-4-methoxybenzylthiosulfuric acid. | Scarlet RS | 0.4% Na$_2$S$_3$ | Red-blue. |
| 16 | Sodium salt of dyestuff resulting from condensing mole of nickel phthalocyanine-trisulfonyl chloride with 3 moles 4-aminobenzylthiosulfuric acid. | do | 0.6% Na$_2$S$_4$ | Do. |
| 17 | [structure: pyrazolone with CO-NH-CH$_2$-CH$_2$-SSO$_3$Na and phenyl-SO$_2$-NH-CH$_2$-CH$_2$-SSO$_3$Na groups and N-phenyl-SO$_2$-NH-CH$_2$-CH$_2$SSO$_3$Na] | Navy blue B | 0.6% Na$_2$S$_4$ | Olive. |

What is claimed is:

1. A method of producing printed textile fibers comprising the steps of:
   (a) applying to cotton or regenerated cellulose textile fibers an alkaline printing paste comprising
      (i) water,
      (ii) thickener,
      (iii) solubilized triazene form of stabilized diazo compound,
      (iv) solubilized naphthol coupling component, and
      (v) dyestuff having per dye molecule at least one pendant —SSO$_3$Na, —SSO$_3$K, —SSO$_3$NH$_4$ or —SSO$_3$H group, which dyestuff is further characterized in being selected from the group consisting of azo dyestuff, sulfur dyestuff, phthalocyanine dyestuff, metal phthalocyanine dyestuff, anine dyestuff, metal phthalocyanine dyestuff, perylene dyestuff, dioxazine dyestuff, anthraquinone dyestuff, and isodibenzanthrone dyestuff;
   (b) drying the fibers;
   (c) acid aging the fibers with volatilized acid and aqueous steam;
   (d) applying aqueous Na$_2$S$_{2-4}$ and either soda ash or sodium borax to the fibers; and
   (e) washing the fibers with water.

2. Cotton or regenerated cellulose textile fibers having printed thereon a mixture of (a) azoic dye and (b) water insoluble dyestuff resulting from reacting Na$_2$S$_{2-4}$ with dyestuff having per dye molecule at least one pendant —SSO$_3$Na, —SSO$_3$K, —SSO$_3$NH$_4$ or —SSO$_3$H group which dyestuff is further characterized in being selected from the group consisting of azo dyestuff, sulfur dyestuff, phthalocyanine dyestuff, metal phthalocyanine dyestuff, perylene dyestuff, dioxazine dyestuff, anthraquinone dyestuff and isodibenzanthrone dyestuff.

3. A method as defined in claim 1, and further characterized in that the fibers are exposed to air for 5–30 seconds following application of said Na$_2$S$_{2-4}$ and either soda ash or sodium borax thereto and prior to washing.

4. A method as defined in claim 1, and further characterized in that said volatilized acid is acetic acid, formic acid, or mixture of formic and acetic acids.

5. A method as defined in claim 1, and further characterized in that said aqueous Na$_2$S$_{2-4}$ which is applied to the fibers contains 0.2%–1.2% Na$_2$S$_{2-4}$, 1–20% NaCl, and about 2% of either soda ash or sodium borax.

6. A product as defined in claim 2, and further characterized in that said textile fibers are fabric or yarn.

7. A product as defined in claim 2, and further characterized in that said azoic dye is derived from triazene form of stabilized diazo compound and a naphthol coupling component.

References Cited

UNITED STATES PATENTS

| 3,264,053 | 8/1966 | Holtzclaw | 8—27 |
| 3,367,929 | 2/1968 | Wagoner | 260—193 |
| 3,415,609 | 12/1968 | Weston | 8—34 |
| 3,419,343 | 12/1968 | Weston | 8—54.2 |

FOREIGN PATENTS

| 1,144,681 | 3/1963 | Germany. |

DONALD LEVY, Primary Examiner

B. BETTIS, Assistant Examiner

U.S. Cl. X.R.

8—1 Q, 54.2

UNITED STATES PATENT OFFICE
CERTIFICATE OF CORRECTION

Patent No. 3,625,642     Dated December 7, 1971

Inventor(s) Feaster V. Tribble

It is certified that error appears in the above-identified patent and that said Letters Patent are hereby corrected as shown below:

Column 6, line 11, Example 3, "aceto-2',5'-" should appear -- acetoacet-2',5'- --; column 7, line 17, Example 6, in the structure:

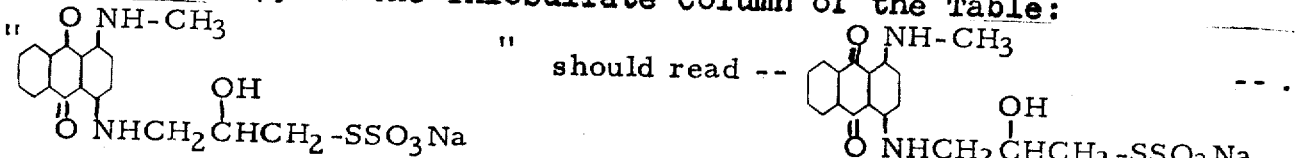

Example 7, in the Thiosulfate Column of the Table:

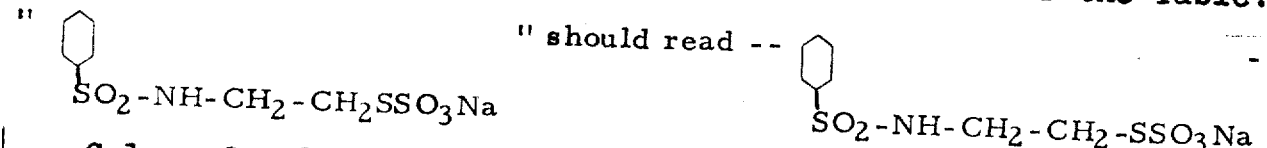

Column 9, Example 17, in the Thiosulfate Column of the Table:

" ⬡
$SO_2-NH-CH_2-CH_2SSO_3Na$ "   should read --  ⬡
$SO_2-NH-CH_2-CH_2-SSO_3Na$ --.

Column 9, claim 1, cancel line 58.

Signed and sealed this 12th day of December 1972.

(SEAL)
Attest:

EDWARD M. FLETCHER, JR.
Attesting Officer

ROBERT GOTTSCHALK
Commissioner of Patents